(12) United States Patent
Wollaston et al.

(10) Patent No.: US 8,292,235 B2
(45) Date of Patent: Oct. 23, 2012

(54) SLAT ASSEMBLY

(75) Inventors: Timothy David Wollaston, Bristol (GB); James Michael Ribeiro, Bristol (GB)

(73) Assignee: Airbus Operations Limited, Bristol (GB)

( * ) Notice: Subject to any disclaimer, the term of this patent is extended or adjusted under 35 U.S.C. 154(b) by 425 days.

(21) Appl. No.: 12/588,823

(22) Filed: Oct. 29, 2009

(65) Prior Publication Data
US 2010/0116944 A1 May 13, 2010

Related U.S. Application Data

(63) Continuation-in-part of application No. PCT/GB2009/050605, filed on Jun. 12, 2009.

(30) Foreign Application Priority Data

Jun. 12, 2008 (GB) .................................. 0810724.5

(51) Int. Cl.
*B64C 9/00* (2006.01)

(52) U.S. Cl. ........ 244/213; 244/214; 244/215; 244/210; 244/216

(58) Field of Classification Search .................. 244/213, 244/214, 215, 210, 216
See application file for complete search history.

(56) References Cited

U.S. PATENT DOCUMENTS

| 3,586,267 | A | * | 6/1971 | Ingelman-Sundberg | 244/215 |
| 4,042,191 | A | * | 8/1977 | Johnson | 244/214 |
| 4,131,252 | A | * | 12/1978 | Dean et al. | 244/215 |
| 4,360,176 | A | | 11/1982 | Brown | |
| 4,702,441 | A | * | 10/1987 | Wang | 244/210 |
| 5,056,741 | A | * | 10/1991 | Bliesner et al. | 244/214 |
| 5,158,252 | A | | 10/1992 | Sakurai | |
| 6,328,265 | B1 | * | 12/2001 | Dizdarevic | 244/215 |
| 2002/0074459 | A1 | | 6/2002 | Gleine et al. | |

FOREIGN PATENT DOCUMENTS

| DE | 19 07 710 | 8/1970 |
| EP | 0 230 681 | 8/1987 |
| GB | 360976 | 11/1931 |
| GB | 1070723 | 6/1967 |
| GB | 2 311 969 | 10/1997 |
| WO | WO 97/49607 | 12/1997 |
| WO | WO 2008/058695 | 5/2008 |

OTHER PUBLICATIONS

International Search Report for PCT/GB2009/050605 mailed Sep. 8, 2009.
Written Opinion for PCT/GB2009/050605 mailed Sep. 8, 2009.
Search Report for GB 0810724.5 dated Oct. 6, 2008.

* cited by examiner

*Primary Examiner* — Christopher P Ellis
(74) *Attorney, Agent, or Firm* — Nixon & Vanderhye P.C.

(57) ABSTRACT

A method of operating an aircraft wing assembly, the assembly comprising a main wing element with a leading edge; a slat on the leading edge of the main wing element; and a seal member. The assembly is placed in a first configuration during take off in which the slat is in a deployed position with a slot between the slat and the main wing element, and the seal member is in a deployed position in which it seals the slot. During cruise both the slat and the seal member are retracted. During landing the slat is deployed fully with a slot between the slat and the main wing element, but the seal member is kept in its retracted position so that the slot remains open.

22 Claims, 5 Drawing Sheets

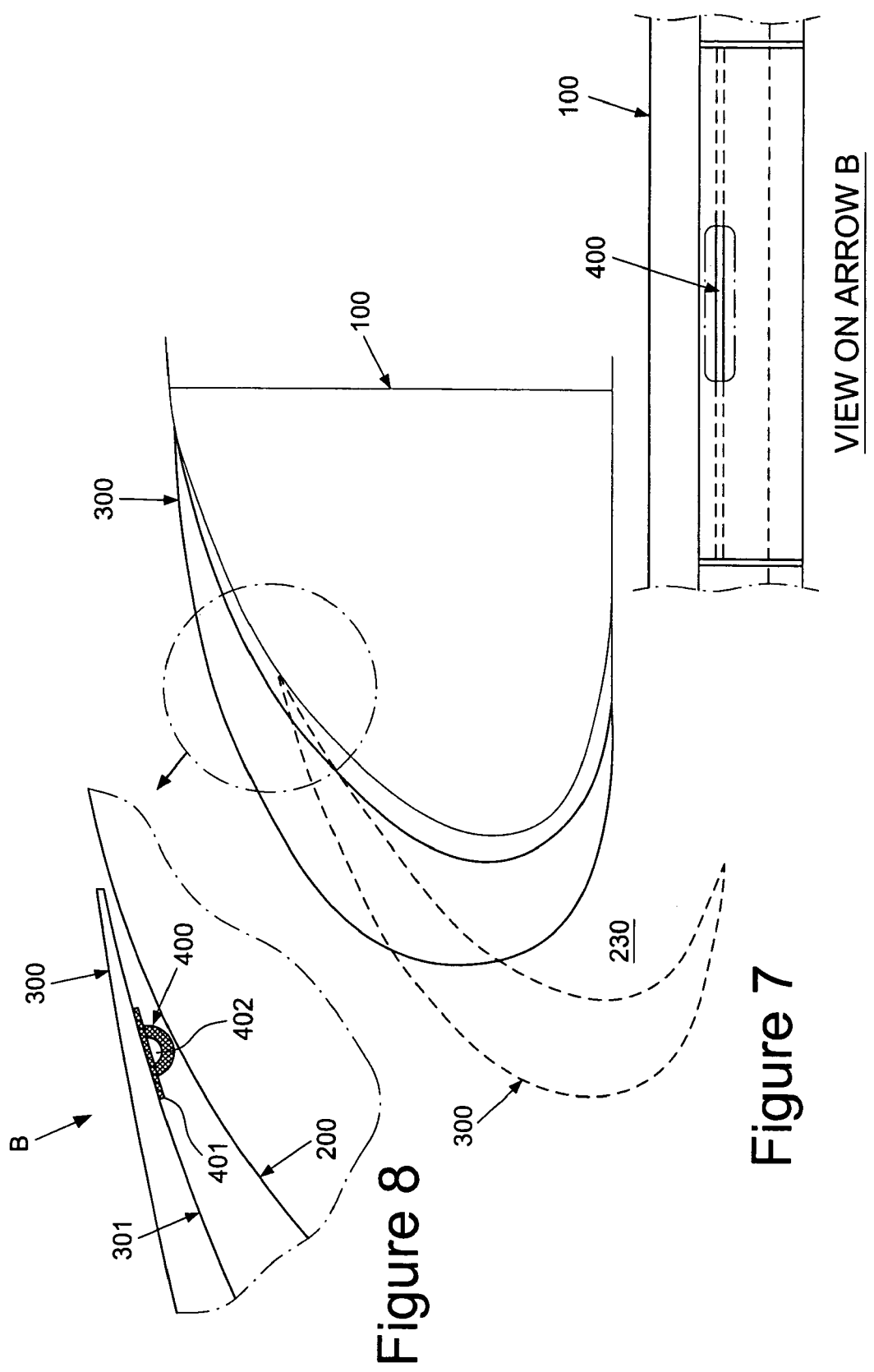

SLAT ASSEMBLY

This application is a Continuation-In-Part of International Application No. PCT/GB2009/050605, filed 12 Jun. 2009, which designated the U.S. and claims the benefit of European Patent Application No. 0810724.5, filed 12 Jun. 2008, the entire contents of each of which are all hereby incorporated herein by reference.

FIELD OF THE INVENTION

The present invention relates to an aircraft wing assembly incorporating a slat, and a method of operating an aircraft wing assembly.

BACKGROUND OF THE INVENTION

Slats are devices on the leading edge of a wing which are deployed during take off and landing to increase the lift of the wing. During landing it is desirable for the slat to be fully deployed for maximum lift. Also, during landing it is desirable to open up a small slot between the slat and the wing leading edge, allowing a small amount of high-pressure air from the lower surface to reach the upper surface, where it helps postpone the stall. However, during take off, whilst it is desirable to deploy the slats at least partially to increase lift, it is preferable that there is no slot between the slat and the wing because this increases drag.

A so-called "sealed slat" seals against the leading edge when in its retracted (cruise) configuration. The slat is carried on a track which is shaped so that the slat follows the curve of the leading edge as it moves to its take off position and thus remains sealed against the leading edge. A problem with such an arrangement is that the track must have a high curvature matching the curvature of the leading edge. This makes the track and associated roller bearings bulky and thus difficult to fit within a shallow leading edge. Also, achieving and maintaining the aerodynamic sealing requirements is a major challenge.

SUMMARY OF THE INVENTION

A first aspect of the invention provides an aircraft wing assembly comprising a main wing element having a fixed leading edge which forms a substantially continuous outer surface between upper and lower wing surfaces; a slat on the fixed leading edge of the main wing element; and a seal member mounted to the main wing element, the seal member having an outer surface which lies substantially flush with the outer surface of the fixed leading edge when in a retracted position, the assembly being adjustable between:
a. a first configuration in which the slat is in a deployed position with a slot between the slat and the main wing element, and the seal member is in a deployed position in which it seals the slot;
b. a second configuration in which both the slat and the seal member are in retracted positions; and
c. a third configuration in which the slat is in a deployed position with a slot between the slat and the main wing element, and the seal member is in a retracted position in which it does not seal the slot.

A second aspect of the invention provides a method of operating an aircraft wing assembly, the assembly comprising a main wing element having a fixed leading edge which forms a substantially continuous outer surface between upper and lower wing surfaces; a slat on the fixed leading edge of the main wing element; and a seal member mounted to the main wing element, the seal member having an outer surface which lies substantially flush with the outer surface of the fixed leading edge when in a retracted position, the method comprising:
a. adjusting the assembly into a first configuration in which the slat is in a deployed position with a slot between the slat and the main wing element, and the seal member is in a deployed position in which it seals the slot;
b. adjusting the assembly into a second configuration in which both the slat and the seal member are in retracted positions; and
c. adjusting the assembly into a third configuration in which the slat is in a deployed position with a slot between the slat and the main wing element, and the seal member is in a retracted position in which it does not seal the slot.

A third aspect of the invention provides an aircraft wing assembly comprising a main wing element having a fixed leading edge; a slat on the fixed leading edge of the main wing element; and a deformable seal member, the assembly being adjustable between:
a. a first configuration in which the slat is in a deployed position with a slot between the slat and the fixed leading edge, and the deformable seal member is in an expanded state in which it seals the slot;
b. a second configuration in which the slat is in a retracted position and the deformable seal member is in a retracted state; and
c. a third configuration in which the slat is in a deployed position with a slot between the slat and the fixed leading edge, and the deformable seal member is in a retracted position in which it does not seal the slot.

A fourth aspect of the invention provides a method of operating an aircraft wing assembly, the assembly comprising a main wing element having a fixed leading edge; a slat on the fixed leading edge of the main wing element; and a deformable seal member, the method comprising:
a. adjusting the assembly into a first configuration in which the slat is in a deployed position with a slot between the slat and the fixed leading edge, and the deformable seal member is in an expanded state in which it seals the slot;
b. adjusting the assembly into a second configuration in which the slat is in a retracted position and the deformable seal member is in a retracted state; and
c. adjusting the assembly into a third configuration in which the slat is in a deployed position with a slot between the slat and the fixed leading edge, and the deformable seal member is in a retracted position in which it does not seal the slot.

Preferably the seal member of the first and second aspects is pivotally mounted to the main wing element so that it rotates between its retracted and deployed positions. Alternatively the seal member of the first and second aspects may translate between its retracted and deployed positions, or may be inflated or otherwise moved.

Preferably the deformable seal member of the third and fourth aspects has an inflatable element, which expands from a retracted position to a deployed position. The deformable seal member of the third and fourth aspects can be mounted either to the main wing element, or to the slat. Preferably the deformable seal member of the third and fourth aspects lies substantially flush with an outer surface of either the main wing element or the slat when in its retracted position. Preferably, the main wing element of the third or fourth aspects has a fixed leading edge which forms a substantially continuous outer surface between upper and lower wing surfaces.

Preferably the seal member seals an upper outlet of the slot when it is in its deployed position, although it could seal a lower outlet of the slot or a mid-point of the slot. Sealing of the upper outlet is preferred because this reduces drag most significantly.

The assembly typically comprises a slat actuation mechanism for moving the slat betweens its deployed and retracted positions; and a seal member actuation mechanism for moving or changing the shape of the seal member between its deployed and retracted positions. The actuation mechanisms may be driven independently of each other—for instance the seal member actuation mechanism may comprise an inflatable bag, a pneumatic or hydraulic jack, or an electric rotary motor which is driven independently of the slat actuation mechanism. Alternatively the motive force for the seal member actuation mechanism may be provided by the slat actuation mechanism, resulting in a dependent motion.

Typically the assembly further comprises a slat track carrying the slat and slidably mounted to the main wing element, for instance by a series of roller bearings. In this case the slat track can have a lower curvature than the surface of the leading edge against which the slat seals in the second configuration. Where a slat track is provided, then a seal member actuation mechanism (such as a pivoting link or a combination of levers and cams) can act between the slat track and the seal member, the seal member actuation mechanism being arranged to drive the seal member between its deployed and retracted positions in response to the sliding motion of the slat.

Typically the assembly is in the first configuration during take off of the aircraft, the second configuration during cruise of the aircraft, and the third configuration during landing of the aircraft.

The slat may be in the same position when the assembly is in both the first and third configurations. However more preferably the slat is fully deployed when the assembly is in the third configuration but only partially deployed when the assembly is in the first configuration.

Similarly the seal member may be partially retracted when the assembly is in the third configuration and fully retracted when the assembly is in the second configuration. However more preferably the seal member is fully retracted when the assembly is in both the second and third configurations.

BRIEF DESCRIPTION OF THE DRAWINGS

Embodiments of the invention will now be described with reference to the accompanying drawings, in which:

FIG. 7 is a sectional side view of the leading edge of an aircraft wing in accordance with a third embodiment with the slat in a retracted (cruise) position shown in full line and in an intermediate (take-off) position shown in dashed line;

FIG. 8 is an enlarged sectional side view showing the deformable seal member of the third embodiment in detail; and FIG. 9 is a view on arrow B in FIG. 8.

DETAILED DESCRIPTION OF EMBODIMENTS

Figure 1:
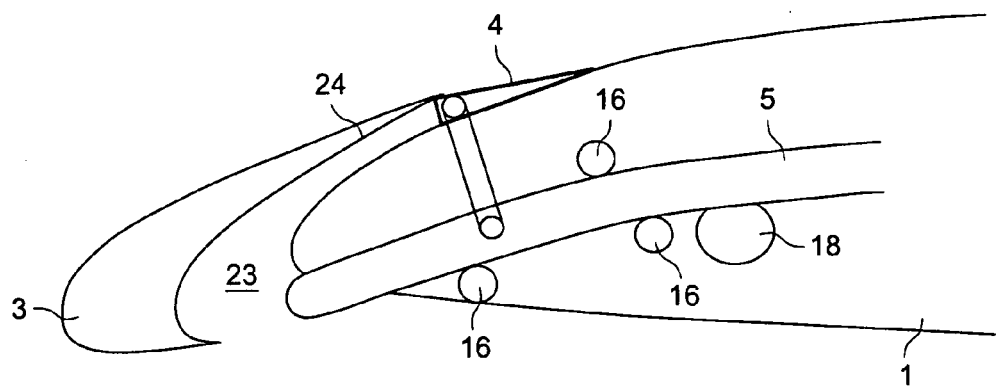
FIG. 1 is a sectional side view of the leading edge of an aircraft wing in accordance with a first embodiment with the slat in an intermediate (take off) position.
Figure 2:
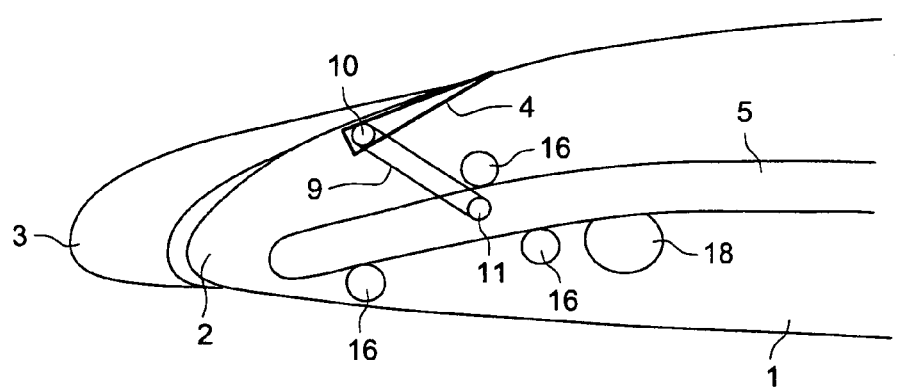
FIG. 2 is a sectional side view of the leading edge of the aircraft wing of the first embodiment with the slat in a retracted (cruise) position.
Figure 3:
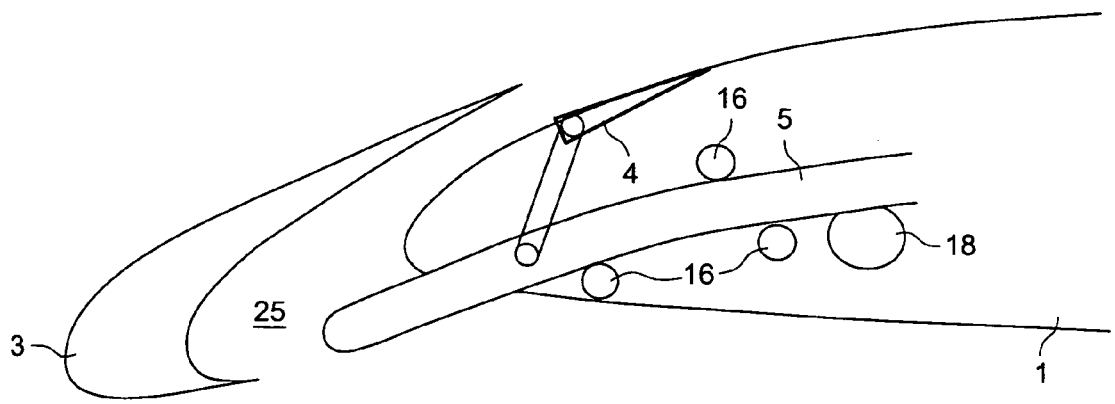
FIG. 3 is a sectional side view of the leading edge of the aircraft wing of the first embodiment with the slat in a fully extended (landing) position.

An aircraft wing assembly shown in FIGS. 1-3 comprises a main wing element 1 with a leading edge 2; a slat 3 on the leading edge of the main wing element; and a seal member 4.

The slat is mounted on a slat track 5, the structure mounting the slat onto the track 5 being omitted in FIGS. 1-3 for purposes of clarity. A series of rollers 16 act as bearings between the main wing element 1 and the slat track 5. Three rollers 16 are shown for purposes of illustration in FIGS. 1-3, but note that a larger number of rollers may be provided and the positions of the rollers varied from the positions shown. The slat track 5 contains a rack 17 (not visible in FIGS. 1-3 but shown in FIG. 5) which is driven by a pinion 18. The rack and pinion actuation mechanism can drive the slat track 5 along the rollers 16 between a retracted position (shown in FIG. 2) and a fully extended position (shown in FIG. 3) via a partially extended position (shown in FIG. 1).

A link 9 is pivotally mounted to the seal member 4 at a pivot point 10, and to the slat track 5 at a pivot point 11.

Figure 4:
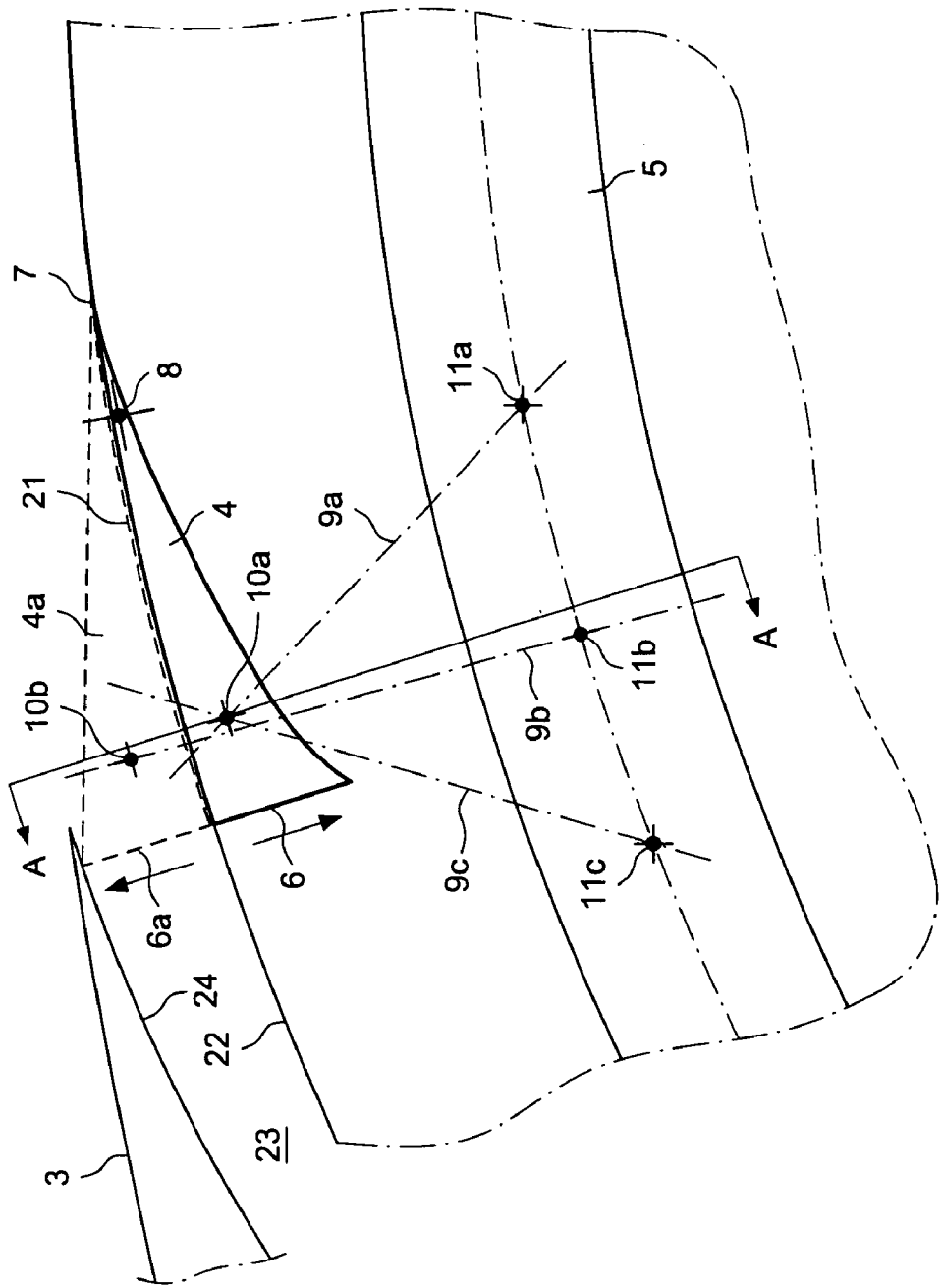
FIG. 4 is an enlarged sectional side view showing the seal member of the first embodiment in detail.

The seal member 4 is shown in further detail in FIG. 4, and comprises a wedge with a thick front face 6 and thin rear tip 7. The seal member is pivotally mounted to the main wing element at a pivot point 8.

Figure 5:
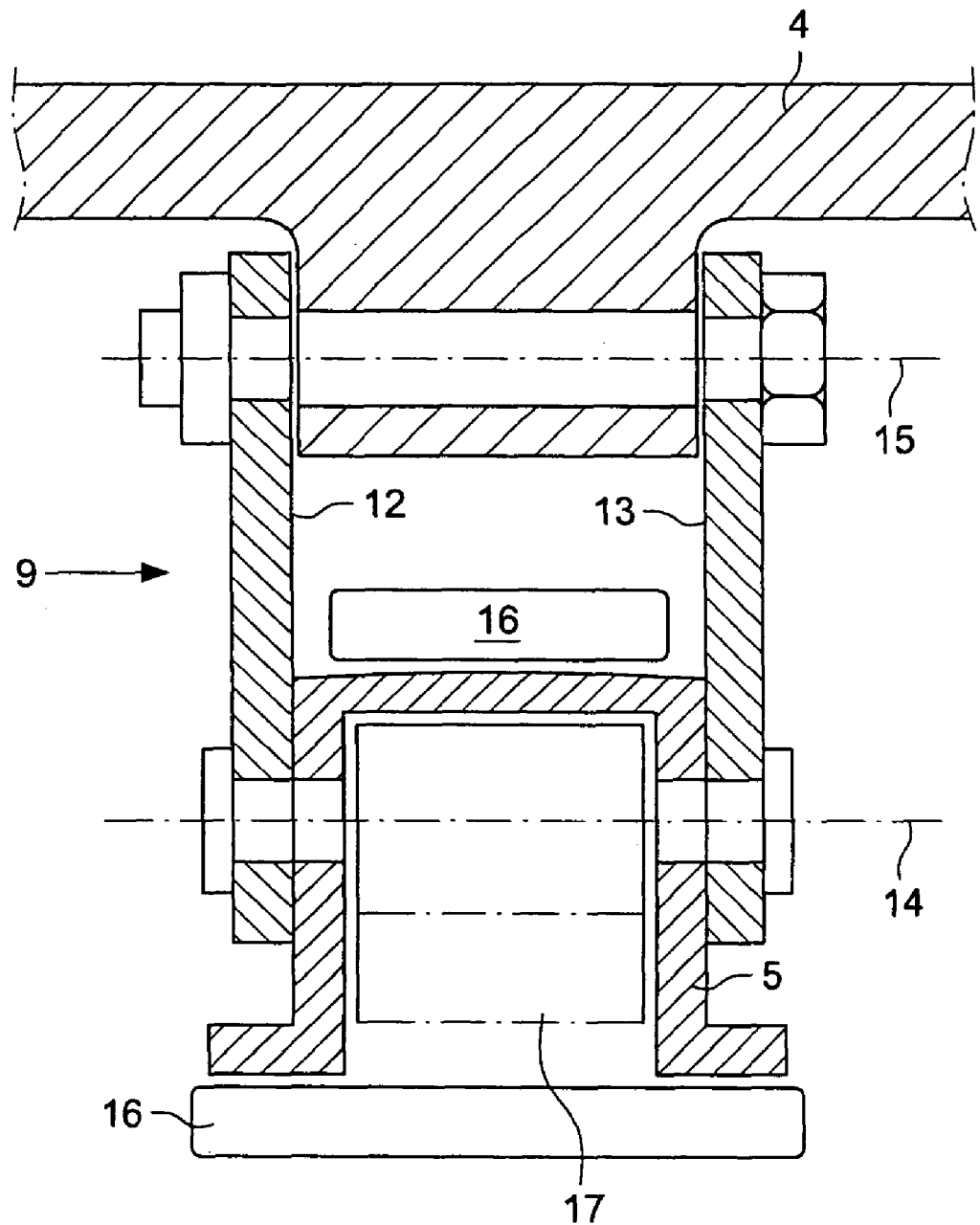
FIG. 5 is a sectional view taken along a line A-A in FIG. 4.

FIG. 5 is a cross-section through the link 9. The link has a pair of arms 12,13 which are pivotally attached to the track 5 and the rack 17 by a pivot pin 14 and to the seal member 4 by a pivot pin 15.

Referring to FIG. 4, as the track 5 translates, the link moves from a position 9a, 10a, 11a to an intermediate position 9b, 10b, 11b pushing the seal member up about pivot point 8 from a retracted position (shown in solid line and labelled 4, 6 in FIG. 4) to a deployed position (shown in dashed line and labelled 4a, 6a in FIG. 4). As the track 5 extends further, the link moves from position 9b, 10b, 11b to position 9c, 10a, 11c pulling the seal member back down to its retracted position 4, 6.

In its retracted position the seal member 4 is embedded within a recess in the main wing element 1 so that its upper face 21 lies flush with the upper surface 22 of the main wing element 1.

The three configurations of the assembly are shown in FIGS. 1-3.

In a first (take off) configuration the slat 3 and seal member 4 are moved to the positions shown in FIG. 1. In this take off configuration the slat 3 is in a partially deployed position with a small slot 23 between the slat and the main wing element, and the seal member 4 is in a deployed position in which it seals an upper outlet of the slot 23 by bearing against the trailing edge of a lower surface 24 of the slat. In the take off configuration the upper surface of the seal member 4 forms a substantially smooth and continuous aerodynamic surface which bridges and fully seals the slot 23 between the slat and the leading edge. This minimizes the drag of the wing assembly during take off.

In a second (cruise) configuration shown in FIG. 2, both the slat and the seal member are moved to their retracted positions. In this configuration the slot 23 is closed and the lower surface 24 of the slat seals against the leading edge of the main wing element 1.

In a third (landing) configuration shown in FIG. 3 the slat is moved to a fully deployed position, creating a large slot 25 between the slat and the main wing element. In the landing configuration the seal member 4 is in its retracted position so that it does not seal the slot 25, and thus the slot remains open allowing high-pressure air from the lower surface of the wing to reach the upper surface of the wing.

The seal member 4 allows for a simpler slat track geometry compared with a conventional sealed slat. Such a conventional sealed slat is carried on a highly curved track and the track is shaped so that the slat follows the curve of the leading edge as it moves to its take off position. The curvature of the track in such a sealed slat mechanism must match the curvature of the leading edge. In contrast, the track 5 shown in FIGS. 1-3 can be designed independently of the curvature of the leading edge. This enables more freedom in designing the track 5—for instance the track 5 can be made less curved than the leading edge so that it can fit within a shallower wing section.

Figure 6:
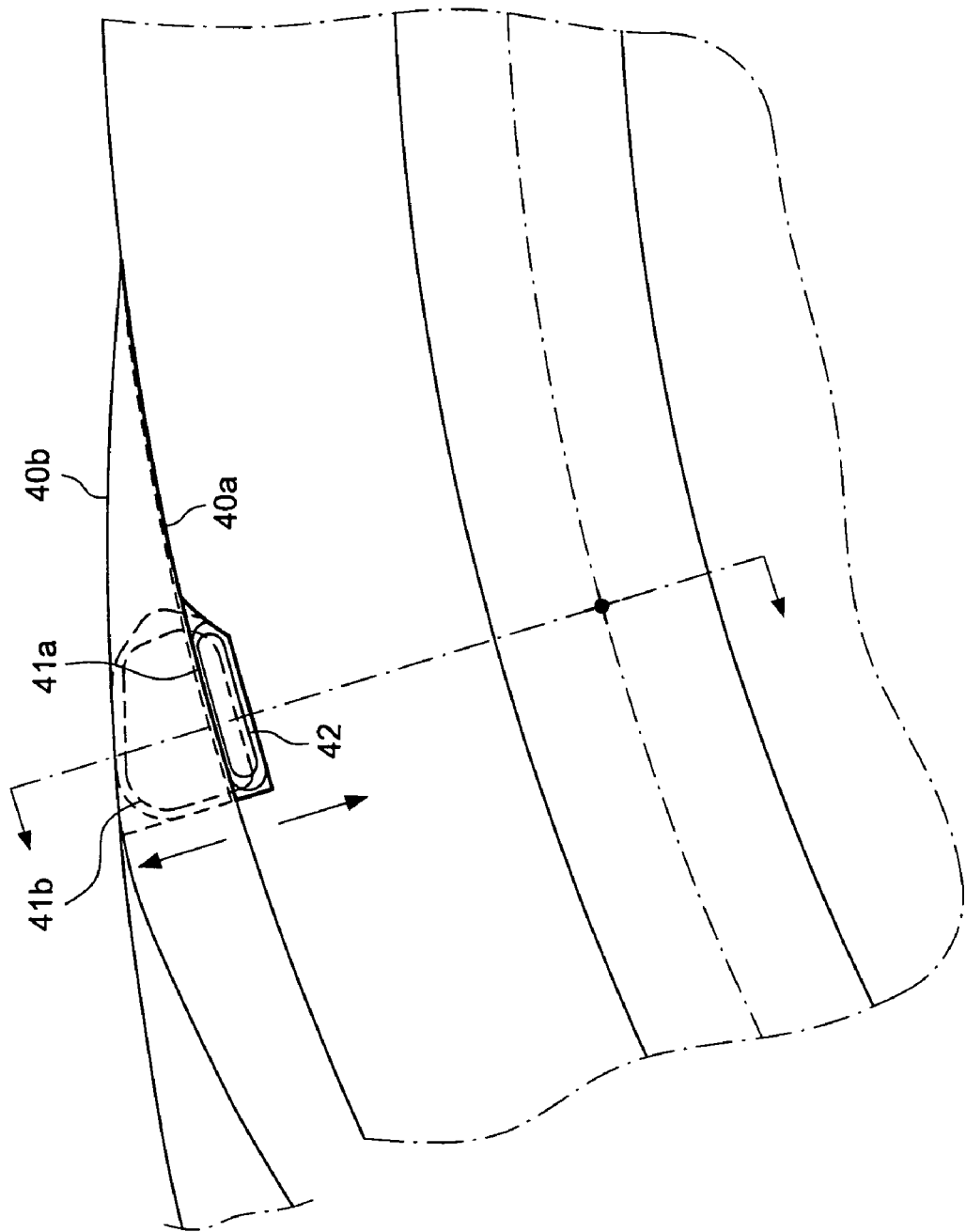
FIG. 6 is a sectional side view of a seal member of a second embodiment driven by an inflatable bag.

FIG. 6 illustrates an alternative seal member with an inflatable actuation mechanism in accordance with a second embodiment. The seal member is a thin curved panel (in contrast to the wedge-shaped seal member 4 shown in FIG. 2). The seal member is shown in its retracted position at 40a and in its deployed position at 40b. In its retracted position 40a the seal member lies against the leading edge. An inflatable bag is seated below the seal member in a recess 42 in the leading edge. The bag is shown in its deflated position in solid lines at 41a and in its inflated position in dashed lines at 41b.

In order to seal the slot, the bag is inflated, bears against the panel, and rotates it up to its deployed position 40b. In contrast to the arrangement of FIGS. 1-5 (in which the motive force for driving the seal member 4 is provided by the motion of the slat track 5, resulting in a dependent motion) the inflatable bag can be driven independently of the slat track.

FIGS. 7 to 9 illustrate the leading edge of an aircraft wing assembly in accordance with a third embodiment. The aircraft wing assembly comprises a main wing element 100 with a leading edge 200; a slat 300 on the leading edge of the main wing element; and a deformable seal member 400.

The slat 300 is shown in a retracted (cruise) position in full line, and in an intermediate (take-off) position in dashed line. In its intermediate position the slat is only partially deployed and can be moved to a fully deployed (landing) position (not shown) by extending the slat 300 further forwardly.

The slat 300 is mounted on a slat track similar to the slat track of the first embodiment described above. The slat track and the mounting structure have been omitted in FIG. 7 for purposes of clarity.

The deformable seal member 400 is shown in further detail in FIG. 8, and is disposed between the trailing edge of a lower surface 301 of the slat 300 and the leading edge 200 of the main wing element 100. The seal member 400 includes a support element 401 and an expansible element 402. In its retracted position the seal member 400 lies flush with the lower surface 301 of the slat 300.

The expansible element 402 may be made of elastomeric material such as rubber. A seal member actuation mechanism may be used for causing the expansible element 402 to change shape between the deployed and retracted positions and may take many forms. For example, the actuation mechanism may include pneumatic, mechanical or electrical means. Activation of the actuation mechanism causes the expansible element 402 of the seal member 400 to change shape by expanding so as to bear against the outer surface of the leading edge 200.

The seal member actuation mechanism may be linked to the slat actuation mechanism, such that the seal member 400 is deployed and retracted in dependence upon the position of the slat, in a similar manner as to the first embodiment. Alternatively the seal member actuation mechanism may be independent of the slat actuation mechanism. The seal member actuation mechanism may include a pneumatic system driven passively by bleeding high pressure air from the airflow around the slat 300 so as to inflate the expansible member 402. A valve may be used such that the expansible member 402 is only inflated when the slat is in certain configurations, e.g. only when the slat is in the take-off configuration. In the landing configuration, high pressure airflow through the large slot between the slat and the leading edge may be used to deflate the seal member such that it is passively driven to return to its retracted position.

In a first (take off) configuration (shown in dashed line in FIG. 7) the slat 300 is in a partially deployed position with a small slot 230 between the slat and the main wing element, and the seal member 400 is in a deployed position in which it seals an upper outlet of the slot 230 by bearing against the leading edge 200 of the main wing element 100. This minimizes the drag of the wing assembly during take off.

In a second (cruise) configuration (shown in solid line in FIG. 7) both the slat and the seal member are moved to their retracted positions. In this configuration the slot 230 is closed and the lower surface 301 of the trailing edge of the slat seals against the leading edge of the main wing element 100.

In a third (landing) configuration (not shown in FIG. 7) the slat is moved to a fully deployed position, creating a large slot between the slat and the main wing element. In the landing configuration the seal member 400 is in its retracted position so that it does not seal the large slot, and thus the slot remains open allowing high-pressure air from the lower surface of the wing to reach the upper surface of the wing.

The seal member 400 allows for a simpler slat track geometry compared with a conventional sealed slat, as the slat 300 need only closely, rather than exactly, follow the curvature of the leading edge 200 of the main wing element 100 as it moves between cruise and take-off configurations. The seal member 400 also provides fewer constraints upon the design of the leading edge profile, and achieves and maintains a better aerodynamic seal than would be possible with traditional sealing methods.

Whilst the third embodiment of the invention described above has the deformable seal member disposed on the lower surface of the slat, it may equally be disposed on the leading edge of the main wing element. In its retracted position, the seal member would lie flush against the leading edge. Deployment of the seal member would cause it to change shape by expanding so as to bear against the lower surface of the slat. Mounted on the leading edge, the seal member could be driven by an actuation mechanism mechanically linked to the slat actuation mechanism by a pivotal linkage to drive the seal member between its deployed and retracted positions in response to the sliding motion of the slat.

The deformable seal member could alternatively seal a lower outlet of the slot or a mid-point of the slot.

Although the invention has been described above with reference to one or more preferred embodiments, it will be appreciated that various changes or modifications may be made without departing from the scope of the invention as defined in the appended claims.

The invention claimed is:

1. An aircraft wing assembly comprising a main wing element having a fixed leading edge which forms a substantially continuous outer surface between upper and lower wing surfaces; a slat on the fixed leading edge of the main wing element; and a seal member mounted to the main wing element, the seal member having an outer surface which lies substantially flush with the outer surface of the fixed leading edge when in a retracted position, the assembly being adjustable between:

a. a first configuration in which the slat is in a deployed position with a slot between the slat and the main wing element, and the seal member is in a deployed position which seals the slot;
b. a second configuration in which both the slat and the seal member are in retracted positions; and
c. a third configuration in which the slat is in a deployed position with a slot between the slat and the main wing element, and the seal member is in a retracted position which does not seal the slot.

2. The assembly of claim 1 wherein the seal member is pivotally mounted to the main wing element.

3. The assembly of claim 1 wherein the seal member seals an upper outlet of the slot when said slat is in said deployed position.

4. The assembly of claim 1 wherein the slat seals against the main wing element when the assembly is in the second configuration.

5. The assembly of claim 1 further comprising an inflatable bag which can be inflated to deploy the seal member.

6. The assembly of claim 1 further comprising a slat actuation mechanism for moving the slat between said deployed and retracted positions; and a seal member actuation mechanism for moving the seal member between said deployed and retracted positions.

7. The assembly of claim 6 wherein motive force for the seal member actuation mechanism is provided by the slat actuation mechanism.

8. The assembly of claim 1 further comprising a slat track carrying the slat and slidably mounted to the main wing element.

9. The assembly of claim 8 further comprising a seal member actuation mechanism acting between the slat track and the seal member, the seal member actuation mechanism being arranged to drive the seal member between said deployed and retracted positions in response to the sliding motion of the slat.

10. The assembly of claim 9 wherein the seal member actuation mechanism comprises a link which is pivotally attached to the slat track and to the seal member.

11. A method of operating an aircraft wing assembly, the assembly comprising a main wing element having a fixed leading edge which forms a substantially continuous outer surface between upper and lower wing surfaces; a slat on the fixed leading edge of the main wing element; and a deployable seal member mounted to the main wing element, the seal member having an outer surface which lies substantially flush with the outer surface of the fixed leading edge when in a retracted position, the method comprising:
a. adjusting the assembly into a first configuration in which the slat is in a deployed position with a slot between the slat and the main wing element, and the seal member is in a deployed position which seals the slot;
b. adjusting the assembly into a second configuration in which both the slat and the seal member are in retracted positions; and
c. adjusting the assembly into a third configuration in which the slat is in a deployed position with a slot between the slat and the main wing element, and the seal member is in a retracted position which does not seal the slot.

12. An aircraft wing assembly comprising a main wing element having a fixed leading edge; a slat on the fixed leading edge of the main wing element; and a deformable seal member, the assembly being adjustable between:
a. a first configuration in which the slat is in a deployed position with a slot between the slat and the fixed leading edge, and the deformable seal member is in an expanded state which seals the slot;
b. a second configuration in which the slat is in a retracted position and the deformable seal member is in a retracted state; and
c. a third configuration in which the slat is in a deployed position with a slot between the slat and the fixed leading edge, and the deformable seal member is in a retracted position which does not seal the slot.

13. The assembly according to claim 12 wherein the seal member includes an inflatable element, which can be expanded to deploy the seal member.

14. The assembly according to claim 12 wherein the seal member is mounted to the main wing element.

15. The assembly according to claim 12 wherein the seal member is mounted to the slat.

16. The assembly of claim 12 wherein the seal member seals an upper outlet of the slot when said slat is in said deployed position.

17. The assembly of claim 12 wherein the slat seals against the main wing element when the assembly is in the second configuration.

18. The assembly of claim 12 further comprising a slat actuation mechanism for moving the slat between its deployed and retracted positions; and a seal member actuation mechanism for moving the seal member between said deployed and retracted positions.

19. The assembly of claim 12 further comprising a slat track carrying the slat and slidably mounted to the main wing element.

20. A method of operating an aircraft wing assembly, the assembly comprising a main wing element having a fixed leading edge; a slat on the fixed leading edge of the main wing element; and a deformable seal member, the method comprising:
a. adjusting the assembly into a first configuration in which the slat is in a deployed position with a slot between the slat and the fixed leading edge, and the deformable seal member is in an expanded state which seals the slot;
b. adjusting the assembly into a second configuration in which the slat is in a retracted position and the deformable seal member is in a retracted state; and
c. adjusting the assembly into a third configuration in which the slat is in a deployed position with a slot between the slat and the fixed leading edge, and the deformable seal member is in a retracted position which does not seal the slot.

21. The assembly of claim 1, wherein the outer surface of the seal member lies substantially flush with an outer surface of the slat when the seal member is in the deployed configuration.

22. The method of claim 11, wherein the outer surface of the seal member lies substantially flush with an outer surface of the slat when the seal member is in the deployed configuration.

* * * * *